W. J. HERRICK.
CLUTCH.
APPLICATION FILED NOV. 25, 1916.
1,227,136.
Patented May 22, 1917.
4 SHEETS—SHEET 1.
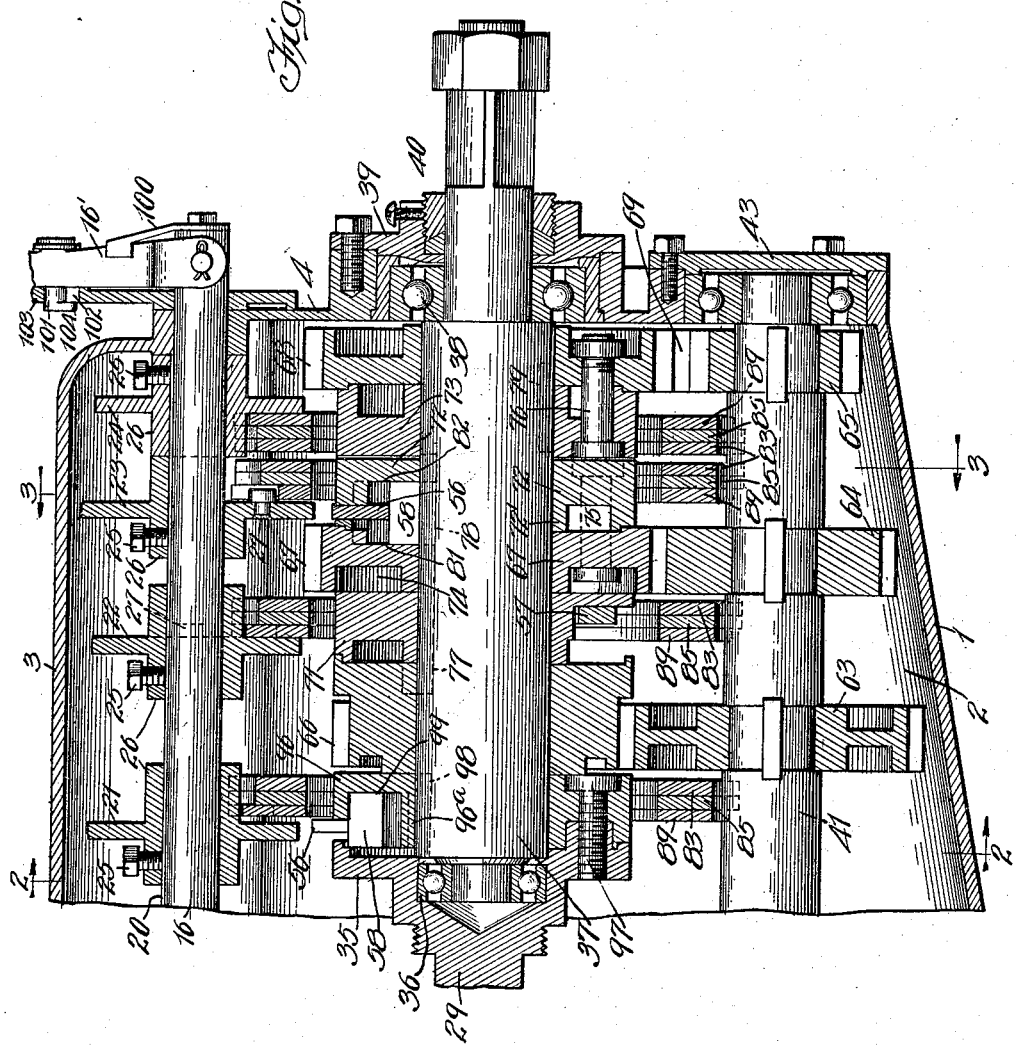

W. J. HERRICK.
CLUTCH.
APPLICATION FILED NOV. 25, 1916.
1,227,136.
Patented May 22, 1917.
4 SHEETS—SHEET 2.
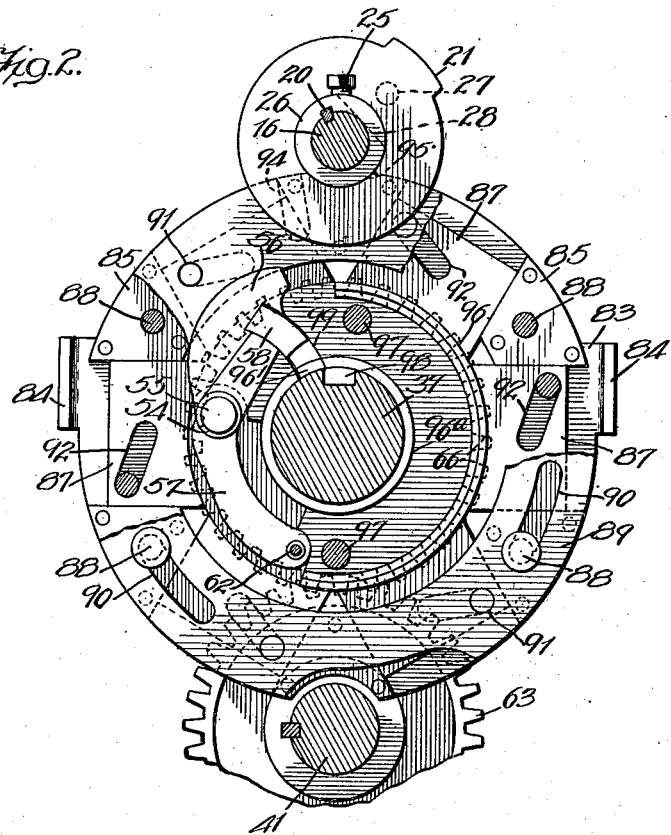
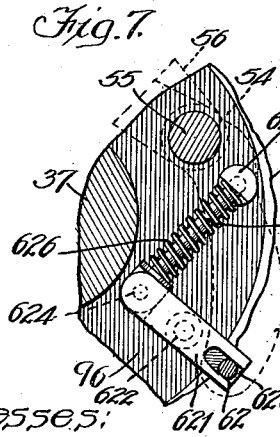
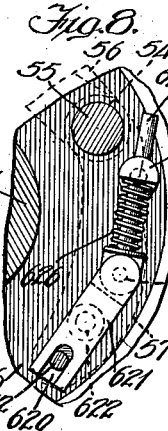
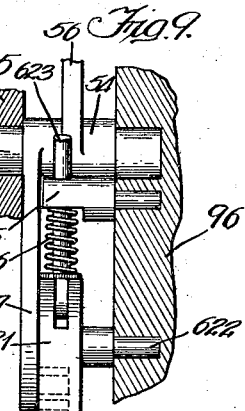

W. J. HERRICK.
CLUTCH.
APPLICATION FILED NOV. 25, 1916.
1,227,136.
Patented May 22, 1917.
4 SHEETS—SHEET 3.
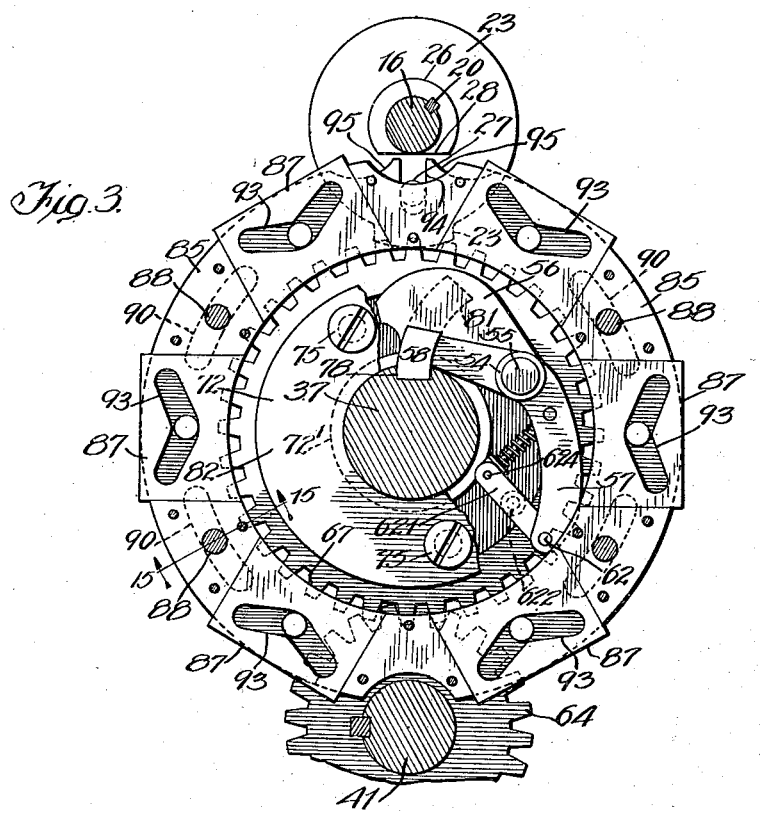
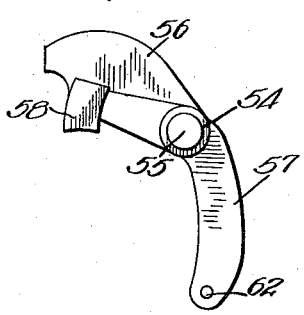
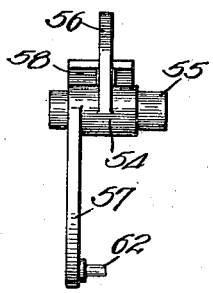
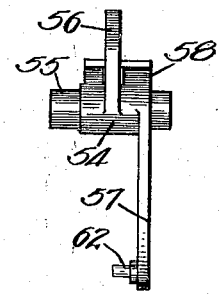

W. J. HERRICK.
CLUTCH.
APPLICATION FILED NOV. 25, 1916.
1,227,136.
Patented May 22, 1917.
4 SHEETS—SHEET 4.
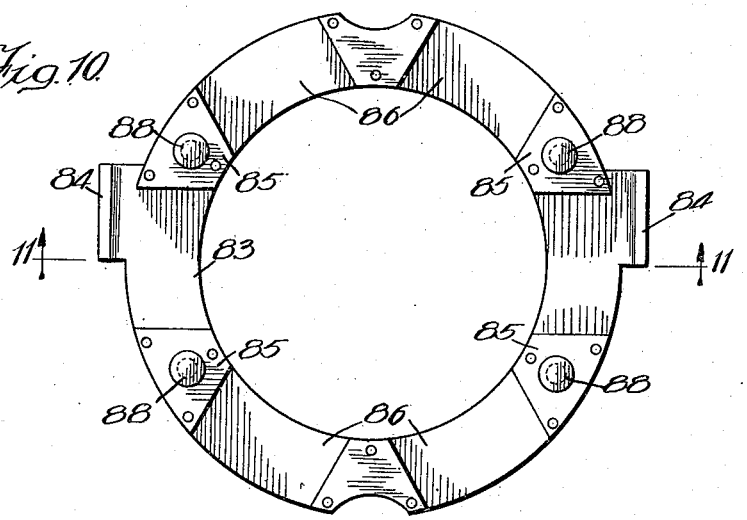
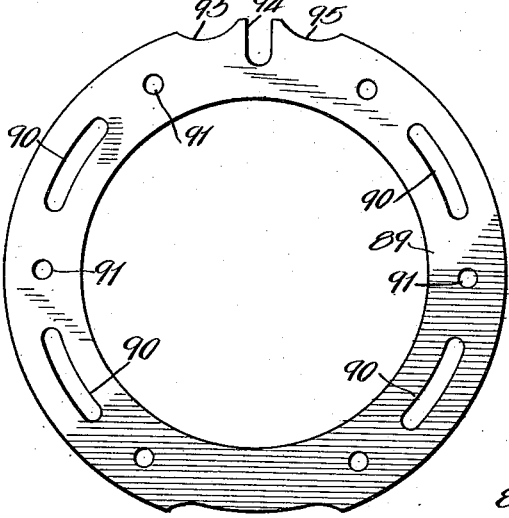
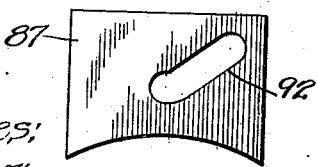
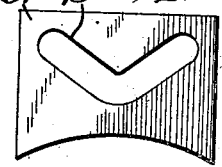
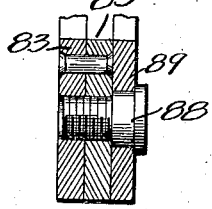

UNITED STATES PATENT OFFICE.

WILLIAM J. HERRICK, OF CHICAGO, ILLINOIS.

CLUTCH.

1,227,136.               Specification of Letters Patent.       Patented May 22, 1917.

Original application filed April 14, 1915, Serial No. 21,233. Divided and this application filed November 25, 1916. Serial No. 133,507.

*To all whom it may concern:*

Be it known that I, WILLIAM J. HERRICK, a citizen of the United States, residing at Chicago, in the county of Cook and State of Illinois, have invented certain new and useful Improvements in Clutches, of which the following is a specification, reference being had therein to the accompanying drawing.

My invention relates to clutches and consists in the novel arrangements and organizations of parts as hereinafter described and pointed out in the claims, this application being a division of my co-pending application filed April 14, 1915, bearing Serial Number 21,233 for transmission gears.

In the accompanying drawings, which exhibit the various features of my invention in practical form, and in which the same reference numerals designate the same or corresponding parts in the different views, Figure 1 is a central vertical sectional view of parts illustrating an application of my invention to gearing for transmitting motion from a drive shaft to a driven shaft;

Figs. 2 and 3 are transverse sectional views on the lines 2—2 and 3—3 respectively of Fig. 1, showing the relations of parts when the latch is disengaged and engaged respectively, parts being broken away in Fig. 3;

Fig. 4 is a detail side view of the combined latch and radial key employed;

Figs. 5 and 6 are top views of right and left hand latches respectively;

Figs. 7, 8 and 9 are detail views of parts of the latch mechanism in different positions;

Fig. 10 is a view in elevation showing one of the annular holders employed;

Fig. 11 is a sectional view on the line 11—11 of Fig. 10;

Fig. 12 is a view in elevation of one of the cam-rings movably mounted on the holders;

Figs. 13 and 14 are detail views of two of the cam-slides used on different holders, and Fig. 15 is a detail sectional view through one of the holders and its cam ring on the line 15—15 of Fig. 3.

To illustrate a practical application of my invention I here show it in connection with the machine of my said co-pending application, and as the details of that machine are fully disclosed in that application I limit the disclosure of it herein to such parts as aid in understanding the construction and operation of the clutch mechanism.

The operating parts are housed and supported in a suitable rectangular casing composed of a trough shaped body 1 and a cap or cover 3 provided with end plates 4, a controller shaft 16 being suitably mounted in the cap and extending out at one end through the cap so that it may be turned by any convenient means as the handle 16' within reach of the operator.

A series of disks having similar peripheral cams 21, 22, 23 and 24 are removably connected to the key of the shaft 16, being fixed thereon by suitable set-screws 25 passing through their hubs 26, and being set along the length of the shaft at different circumferential points, the cam shaft 16 being held against longitudinal displacement by suitable means. Each of the cam disks 21, 22, 23 and 24 is provided on its body with a projecting pin 27 in the radial line of its associated cam-center, the pins of the cams 21, 22 and 23 facing in the same direction as they are the cams governing the transmission of differential motion in the same direction at high, intermediate and low speeds respectively, while the pin of the cam 24 faces in the opposite direction as shown in Fig. 1 as it is the cam for motion in the reverse direction. Each of the hubs 26 is faced off or cut away as shown at 28 for a purpose to be hereinafter described.

The drive shaft 29 and the driven shaft 37 are adapted to be coupled directly together as hereafter described for the direct drive of the latter in the same direction and at the same speed as the former, and they are also adapted to be indirectly coupled together through a lay-shaft 41 to drive the shaft 37 in the same direction as, but at different speeds from, the shaft 29, and also to drive the shaft 37 in the reverse direction. In the form shown I provide for three different speeds of the driven shaft 37 in one direction, and for its single speed in the opposite direction, though it is obvious that the number of speeds may be varied by varying the necessary parts comprising a unit normally employed therefor. In practice the drive-shaft 29 is journaled in bearings and is provided at its inner end with a head 35 in which the inner end of the driven shaft 37 is journaled, its outer end being journaled in the plate 39 and connected with the driven machine. The lay-shaft 41 is suitably journaled at each end in the lower part of the case, as in end plates 43, and is adapted to be driven from the drive shaft as desired.

To drive the shaft 37 directly from shaft 29 for high speed in the same direction, while the lay-shaft 41 stands idle, the selective cam 21 operates on an associated latch (Fig. 2) located in a housing formed on the drive-shaft by the head 35 and a disk 96 bolted thereto at 97, and adapted to couple the housing to the shaft 37. The latch (Figs. 4 and 5) comprises a body 54 pivotally mounted in the chamber of the housing by means of suitable pintles 55 loosely journaled in the opposite sides of the housing, and a pair of oppositely extending head and tail wings 56 and 57, respectively, which are offset from each other in different vertical planes and are adapted to be extended through a slot in the peripheral wall of the housing. The head wing 56 carries a key 58 on its under-side which is adapted to pass through an opening 96' in the sleeve 96ᵃ of the housing to engage a key-way 98 in the shaft 37, and the key is extended laterally on both sides of the wing 56 to engage in opposite grooves 99 in the disk 96 and head 35 composing the side walls of the housing curved on the arc of a circle whose center is that of the pivot of the latch, so that when the key is in its operative position it acts directly between the shaft 37 and the sleeve 96ᵃ of the housing to transmit the force of the latter as the driving member directly to the former as the driven member and to remove all strain from the other parts of the latch. The latch after being initially moved by its cam 21 is thrown to and held in its extreme engaging position by a spring. The tail of the latch carries a pin 62 movable in a slot 620 in the outer end of an arm 621 pivoted at 622 in the housing and carrying at its inner end a rod 623 pivoted thereto at 624; the free end of the rod passes freely through a guide 625 rotatably mounted in the housing, and a coil-spring 626 on the rod reacts between the guide and arm. The arrangement is such that the spring re-acting against the bracket 625 and the inner end of arm 621 throws the latter to the extreme of its movement on either side of pivot 622 (Figs. 7, 8, and 9), and the spring thus moves the latch through its final movement in engaging direction and holds it in the key-way 98. The latch employed in the present location is a right-hand latch (Fig. 5) in which the head 56 lies at the right side of its tail. The head 56 is deep enough to extend outside the housing when its key rests on the sleeve 96ᵃ and its upper curved edge then lies in the radius of its throw-in cam 21, the arrangement being such that when this cam is set in its operative position it acts on the head 56 to throw the key down through the opening 96' in the sleeve 96ᵃ into contact with the periphery of the shaft 37, in which position the inner end of the arm 621 is thrown inwardly across its pivot to permit the spring to force the key down in its path 99, and when the key revolving with the head 35 of the drive shaft reaches its key-way 98 in the shaft 37 the spring 626 moves the key into its way so that the shaft 37 is rotated by the main shaft 29. The arrangement of the parts is such that the key 58 is in effect locked in its way by the spring, and the depression of the key into its way projects its tail 57 outwardly beyond its housing as shown in Fig. 7.

To drive the shaft 37 in the same direction as, but at different speeds from, the drive shaft 29, and also to drive the shaft 37 in the reverse direction, similar latches are employed between the shaft 37 and similar housings loose on said shaft and selectively driven by the lay-shaft 41, which receives its motion from the drive shaft 29 in suitable manner.

A bank of gears 63, 64 and 65 of different sizes is keyed on the lay-shaft 41, and a second bank of gears 66, 67 and 68 is loosely mounted on the driven shaft 37, the gears 67 and 68 being of the same size and preferably larger than the gear 66; the gears 63 and 64 mesh respectively with the gears 66 and 67, and the gear 68 is driven from the gear 65 so as to revolve in a direction opposite to the direction of the other loose gears by means of an interposed idle gear 69 loosely mounted on a stub-shaft not shown.

Each of the gears 66, 67 and 68 is coupled to and uncoupled from the driven shaft 37 by a left-hand latch (Fig. 6), the latches being respectively controlled and operated from the associated selective cams 22, 23 and 24 on the controller shaft. Each gear 66, 67 and 68 carries a latch-housing whose walls are formed by the opposing face of the gear and an associated disk 71, 72 and 73, respectively, the parts of each housing being bolted together by bolts 74, 75 and 76, respectively, with the associated latches pivotally arranged in the respective chambers formed thereby, and adapted to have their keys 58 pass through similar openings in the sleeve of the associated housing to engage key-ways 77, 78 and 79, rspectively, and with their wings arranged to pass through peripheral slots in the chambers as above described. These various arrangements are exemplified in Figs. 1 and 3, the latter of which is a typical illustration of similar parts for the other gears 66 and 68; each key 58 moves in a path formed by similar curved grooves cut in the opposing walls of its housing, as shown at 81 and 82 for example, each is depressed by its respective cam 22, 23 or 24 to enter the opening in the sleeve of its respective housing, as shown at 72' for example, and when each reaches its associated key-way in the revolution of its gear it is moved into engagement with the shaft 37 by its spring, the depression of each key into its way moving its tail outwardly beyond its housing as shown in Fig. 3.

Each latch is normally locked in its inoperative position, being locked and unlocked by mechanism controlled by its cam-disk on the controller shaft 16. When the controller shaft is turned to rotate any one of its cams to its inoperative position, it causes the associated locking mechanism to engage the tail 57 of the associated latch to retract its key to the top of its path out of engagement with the shaft 37, and to lock the latch in its retracted position. The locking mechanism locks each latch in its inoperative position as long as its associated cam remains inactive, and when this cam is selected this mechanism unlocks its latch for operation but still locks the other latches in their inoperative positions.

At the housing of each gear 66, 67 and 68 a transverse holder, preferably in the form of an annulus 83 (Fig. 10), is arranged with its ends fixed to the sides of the case by ears 84, and with its ring surrounding the shaft 37 and its connected parts. Each holder carries a plurality of tracks 85 providing intermediate radial ways 86 in which slides 87 are movably located, and also a plurality of shouldered studs 88 upon which a cam-ring 89 is mounted for concentric movement by elongated slots 90, the heads of the studs holding the cam-ring in place against the faces of the tracks 85 on the annulus with the slides between the annulus and ring (Fig. 15). Pins 91 fixed on the movable cam-rings enter diagonal slots in the slides to move the latter radially to and from the latches, it being understood that the slides of each ring lie in the plane of the tail of an associated latch. The diagonal slots in the slides will be variously arranged according as the clutch is a one-way or two-way clutch, that is according as its latch is operated by its cam approaching it from one or both sides or directions. For example, the diagonal slots 92 in the slides associated with the latch for the gear 68 extend only in one direction (Fig. 13) as this is the reverse gear and the arrangement of the parts is such that the reverse position of the controller shaft is at one of the extremes of its movement and so the approach to this position is always in the same direction or by turning the controller shaft in one direction, while the slots 93 in the slides associated with the gears 66 and 67 are oppositely inclined or extend in two directions away from a common center (Figs. 3 and 14) as these are the gears for medium and low speeds respectively and the arrangement of the parts is such that the approach to either of these positions may be from either side or by turning the controller shaft in either direction. Each cam-ring is also provided with a radial slot 94 in the path of the pin 27 on its associated selective cam on the controller shaft 16, and each ring and its associated cam are provided with interlocking means, preferably formed by the convex cam-hub 26 and concave notches 95 in the rings corresponding to the curvature of the hubs, so that when any one of the cams 22, 23 or 24 is turned to inoperative position its hub will interlock with its cam-ring to prevent movement of the latter (Fig. 2) but when a cam is turned to operative position the faced-off portion 28 of the hub will unlock its ring to permit the stud 27 on entering the slot 94 to move the ring (Fig. 3). The ring associated with the gear 68 has only a single notch 95 at one side of its slot 94 for the same reason that the slots 92 of its slides are only one-way slots, while the rings associated with the gears 66 and 67 have notches on opposite sides of their slots 94 (Figs. 3 and 12) for the same reason that the slots 93 of their slides are two-way slots. The parts are arranged with the head wings 56 of their respective latches in the paths of their respective selective cams, and the tail wings in the paths of their respective slides. When the latches are disconnected from the shaft 77, the cam-rings 89 stand in locked position (Fig. 2 for example) with the pins 91 at the outer ends of their slots 92 or 93 (as the case may be) to hold the associated slides 87 in their inward position, and as the slides are in the path of the initial movement of the latch tails 57 they lock the latches in inoperative position to hold their keys out of the associated key-ways in the shaft 37, whereby the latter is not revolved. When the controller shaft is turned to its position to set any one of its selective cams 22, 23 or 24, as in Fig. 3 for example, the associated cam-ring 89 is released by the disengagement of the parts 26 and 95, and the pin 27 of the selected cam enters its associated slot 94 to turn its cam-ring, and the pins 91 of the ring will move the associated slides 87 to their outward position to release the tail wing 57, and the selected cam 22, 23 or 24 (as the case may be) will then pass to position in the path of the head wing 56, and as the associated gear 66, 67 or 68 is rotated from shaft 41 its latch will move under its cam and be pressed by it into the opening in the inner wall of its housing and when this opening registers with the associated key-way on the shaft 37 the latch-key will be forced by the latch-spring into the key-way to revolve the shaft. The engaged or operative position of the parts is shown in Fig. 3 where the low gear 67 is coupled to the shaft 37, and it will be obvious that the same result is obtained for either of the other gears 66 or 68 according as its selective cam is moved to operative position, the selective cams 22, 23 and 24 being set at different circumferential points on the controller shaft so that when any one of them is in its operative position the others will be in their inoperative positions. By this organization shaft 37 may be selectively driven from the lay-shaft at low and intermediate speeds in the same direction as shaft 29, and in reverse direction thereto.

While the shaft 37 is thus indirectly driven by the lay-shaft, the clutch between the shafts 29 and 37 is inoperative. The latch of this clutch is similarly locked and unlocked by a set of slides 87 mounted in the radial ways in a holder 83 and having one-way diagonal slots 92 to receive the slide-operating pins 91 in a movable cam-ring 89 (Fig. 2), the arrangement of parts being similar to those for the gear 68, but with the slots 92 oppositely directed and the interlocking notch 95 on the opposite side of slot 94, as the approach to the high speed position is in the opposite direction from the approach to the reverse-drive position. When the cam 21 stands idle its hub 26 interlocks with the notch 95 of its cam-ring to hold the slides in their inward position so that the tail wing 57 of its latch is locked in retracted position in the housing and the latch cannot engage the shaft 37 (Fig. 2), but when the cam 21 is moved to operative position the cut-away portion 28 of its hub releases the cam-ring and the pin 27 engages the slot 94 to move the ring to withdraw the slides to release the latch, and the cam 21 depresses its latch-key into the opening 96′ of the sleeve of its housing so that when this opening in the revolution of the housing registers with the associated key-way 98 its spring snaps its key into engagement with the shaft 37 to revolve the latter. When the cam 21 is moved back to inoperative position its pin 27 rotates the cam-disk back to its original position to interlock with hub 26 and cause the slides to move inwardly and engage the latch tail 57 (Fig. 2) to withdraw the key 58 from the key-way 98 to release the shaft 37 and to lock the latch in its inoperative position. In the organization here shown the latch of the direct-drive clutch will be locked in its retracted or inoperative position during all the time the lay-shaft may be operated, and the latches corresponding with the several drives of the lay-shaft may then be selectively operated, while the latches of the indirect-drive clutches will be locked in inoperative position during the time the direct-drive clutch may be operated.

The clutch mechanism may be employed in other machines or relations to couple and uncouple driving and driven elements, its present exemplification with the transmission gearing of my said co-pending application being employed to illustrate a practical application of it, and various changes may be made in the form and arrangement of the various parts.

I claim:—

1. In a device of the class described, a shaft having a way, a housing loose on the shaft and having an opening registering with the way at each revolution of the housing on the shaft, a latch pivoted in the housing and movable toward and away from the shaft and having a key extending through the opening, and means to operate the latch to cause the key to engage the way.

2. In a device of the class described, a shaft having a key-way, a housing loose on the shaft and having a guideway, a latch pivoted on the housing and movable toward and away from the shaft and having a lateral key extending into the guideway, and means to operate the latch to cause the key to engage the key-way.

3. In a device of the class described, a shaft having a key-way, a housing loose on the shaft and having guides in its walls, a latch pivoted in the housing and movable toward and away from the shaft and having a lateral key extending into the guides, and means to cause the latch to engage and disengage the key-way.

4. In a device of the class described, a shaft having a key-way, a housing loose on the shaft and having guides in its walls, a latch pivoted in the housing and movable toward and away from the shaft and having a lateral key in the guides, and selective means to move the latch to cause its key to engage and disengage the key-way.

5. In a device of the class described, a shaft having a key-way, a housing loose on the shaft and having an opening registering with the key-way at each revolution of the housing on the shaft, guides in the housing, a latch pivoted in the housing and movable toward and away from the shaft and having a key in the guides, and means to move the latch to cause the key to pass through the opening and engage the key-way.

6. In a device of the class described, a shaft, a rotating member, a latch pivoted on the rotating member and having wings in different planes, and means to alternately engage the wings of the latch to couple and uncouple the latch and shaft, the said means also locking the latch in its uncoupled position.

7. In a device of the class described, a shaft, a rotating member, a latch pivoted on the rotating member and having wings in different planes, a cam to engage the coupling wing of the latch, and a radially moving device to engage the uncoupling wing of the latch.

8. In a device of the class described, a shaft, a driving member, a latch pivoted on the driving member and having wings in different planes, a cam to engage the coupling wing of the latch, radially moving slides to engage its uncoupling wing, and a selecting device to move the cam and slides to couple and uncouple the selected latch and shaft.

9. In a device of the class described, a shaft, a rotating member, a latch pivoted on said member and having oppositely extending wings in different planes, a cam to engage the coupling wing, radially moving slides to engage the uncoupling wing, means to actuate the slides, and means on the cam to move the slide-actuating means.

10. In a device of the class described, a shaft, a rotating member, a latch pivoted on said member and having oppositely extending wings in different planes, a cam to engage the coupling wing, radially moving slides to engage the uncoupling wing having diagonal slots, a cam-ring having pins in said slots, and means on the cam to actuate the ring.

11. In a device of the class described, a shaft, a rotating member, a latch pivoted on the rotating member and having wings in different planes, a shaft having a cam to engage the coupling wing, movable means to engage the uncoupling wing, and connections between said movable means and cam-shaft to move said means in one position of the shaft and to lock them in its other positions.

12. In a device of the class described, a shaft, a rotating member, a latch pivoted on the rotating member and having a pair of oppositely extending wings in parallel planes, a shaft having a cam to engage the coupling wing, a holder having radially movable slides to engage the uncoupling wing, diagonal slots in said slides, a cam-ring on the holder having pins in said slots and provided with a radial slot and peripheral notch, a pin on the cam engaging the slot, and an interlocking sleeve on the cam engaging the notch.

In testimony whereof I affix my signature in presence of two witnesses.

WILLIAM J. HERRICK.

Witnesses:
J. McRoberts.
Edith H. Wilcox.

Copies of this patent may be obtained for five cents each, by addressing the "Commissioner of Patents, Washington, D. C."